US009585520B2

(12) United States Patent
Liu

(10) Patent No.: US 9,585,520 B2
(45) Date of Patent: Mar. 7, 2017

(54) STAND MIXER WITH CORDLESS KITCHEN APPLIANCE

(75) Inventor: Wei Liu, Chicago, IL (US)

(73) Assignee: SEARS BRANDS, L.L.C., Hoffman Estates, IL (US)

(*) Notice: Subject to any disclaimer, the term of this patent is extended or adjusted under 35 U.S.C. 154(b) by 1838 days.

(21) Appl. No.: 12/852,250

(22) Filed: Aug. 6, 2010

(65) Prior Publication Data
US 2011/0036248 A1 Feb. 17, 2011

Related U.S. Application Data

(60) Provisional application No. 61/232,080, filed on Aug. 7, 2009.

(51) Int. Cl.
A47J 43/08 (2006.01)
A47J 43/06 (2006.01)
A47J 43/07 (2006.01)

(52) U.S. Cl.
CPC ............. A47J 43/087 (2013.01); A47J 43/06 (2013.01); A47J 43/0705 (2013.01)

(58) Field of Classification Search
USPC ........ 416/95; 366/46–48, 54, 59, 64, 69, 94, 366/95, 96, 97, 98, 99, 142, 144, 185, 197, 366/200, 207, 279, 297, 300, 301, 343, 366/344, 348, 601; 318/305, 306; 73/901; 74/16; 99/484
See application file for complete search history.

(56) References Cited

U.S. PATENT DOCUMENTS

| 4,277,181 A | 7/1981 | Stahly et al. |
| 4,822,172 A * | 4/1989 | Stottmann ..................... 366/142 |
| 7,175,338 B2 | 2/2007 | Hooper et al. |
| 2004/0129809 A1* | 7/2004 | Siano et al. .................... 241/92 |

FOREIGN PATENT DOCUMENTS

EP 1419723 A2 * 5/2004 ............... A47L 5/36

OTHER PUBLICATIONS

Merriam-Webster online dictionary. Definition of Integrated, downloaded on Jan. 22, 2014. http://www.meriam-webster.com/dictionary/integrated.*

* cited by examiner

Primary Examiner — Thien S Tran
(74) Attorney, Agent, or Firm — McAndrews, Held & Malloy, Ltd.

(57) ABSTRACT

An embodiment of the present invention is directed to a mixing system. The mixing system includes a stand mixer having a charging dock. The charging dock includes a charging output that provides a charging current. The mixing system also includes a cordless kitchen appliance having a rechargeable battery disposed therein. The cordless kitchen appliance is coupleable to the charging dock. The charging output provides the charging current to the rechargeable battery when the cordless kitchen appliance is coupled with the charging dock.

17 Claims, 2 Drawing Sheets

STAND MIXER WITH CORDLESS KITCHEN APPLIANCE

CLAIM OF PRIORITY UNDER 35 U.S.C. §119

The present Application for Patent claims priority to Provisional Application No. 61/232,080 entitled "Stand Mixer with Cordless Kitchen Appliance" filed Aug. 7, 2009, and assigned to the assignee hereof and hereby expressly incorporated by reference herein.

BACKGROUND

Field

Embodiments of the present invention generally relate to the field of small household appliance. More particularly, embodiments of the present invention relate to the field of stand mixers.

Background

Conventional stand mixers, such as those disclosed in U.S. Pat. Nos. 4,277,181, 4,822,172 and 7,175.338, the disclosures of which are incorporated by reference herein, were originally developed in 1908. Over the years, the size of the conventional stand mixer has generally decreased from huge industrial mixers to the small countertop mixers of today, and the aesthetics have changed to reflect the style of the times. Still, the overall function of the conventional stand mixer remains largely unchanged.

Conventional stand mixers tend to be heavy and awkward and thus not very portable. However, modem day consumer demand places a premium on kitchen appliances that are multi-function and provide a certain degree of flexibility and portability.

SUMMARY

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

An embodiment of the present invention is directed to a mixing system. The mixing system includes a stand mixer having a charging dock. The charging dock includes a charging output that provides a charging current. The mixing system also includes a cordless kitchen appliance having a rechargeable battery disposed therein. The cordless kitchen appliance is coupleable to the charging dock. The charging output provides the charging current to the rechargeable battery when the cordless kitchen appliance is coupled with the charging dock.

BRIEF DESCRIPTION OF THE DRAWINGS

The accompanying drawings, which are incorporated in and form a part of this specification, illustrate embodiments of the invention and, together with the description, serve to explain the principles of embodiments of the invention.

DETAILED DESCRIPTION

Reference will now be made in detail to the preferred embodiments of the invention, examples of which are illustrated in the accompanying drawings. While the invention will be described in conjunction. with the preferred embodiments, it will be understood that they are not intended to limit the invention to these embodiments. On the contrary, the invention is intended to cover alternatives, modifications and equivalents, which may be included within the spirit and scope of the invention as defined by the claims. Furthermore, in the detailed description of the present invention, numerous specific details are set forth in order to provide a thorough understanding of the present invention. However, it will be obvious to one of ordinary skill in the art that the present invention may be practiced without these specific details. In other instances, well known methods, procedures, components, and circuits have not been described in detail as not to unnecessarily obscure aspects of the present invention.

Figure 1:
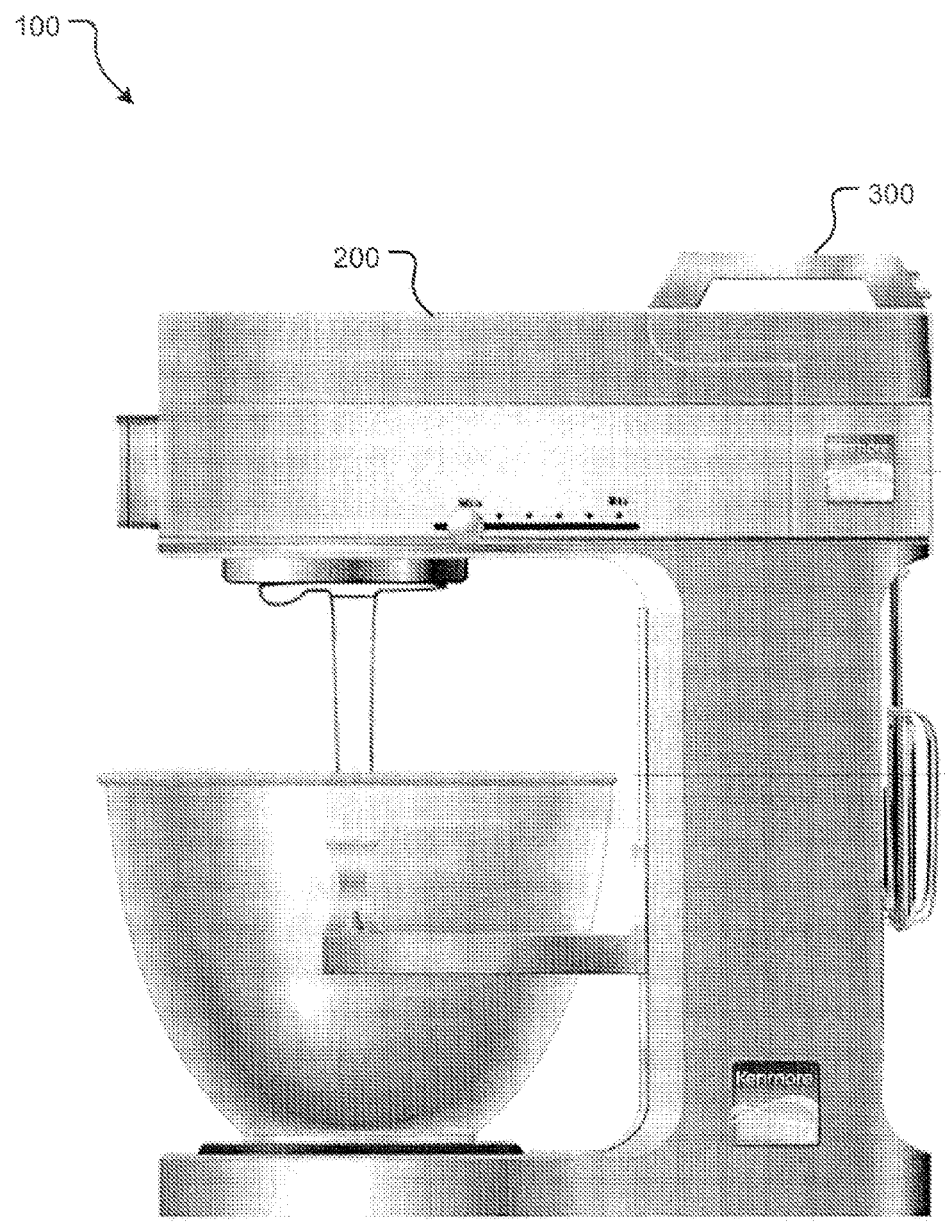
FIG. 1 illustrates a stand mixer with a cordless kitchen appliance docked therein for recharging, in accordance with an embodiment of the present invention.

Generally speaking, embodiments provide for a stand mixer capable of recharging other small kitchen appliances. FIG. 1 illustrates a mixing system 100 that includes a stand mixer 200 with a cordless kitchen appliance 300 docked therein for recharging, and FIG. 2 illustrates the stand mixer 200 of FIG. 1 with the cordless kitchen appliance 300 separated therefrom, in accordance with an embodiment of the present invention.

Figure 2:
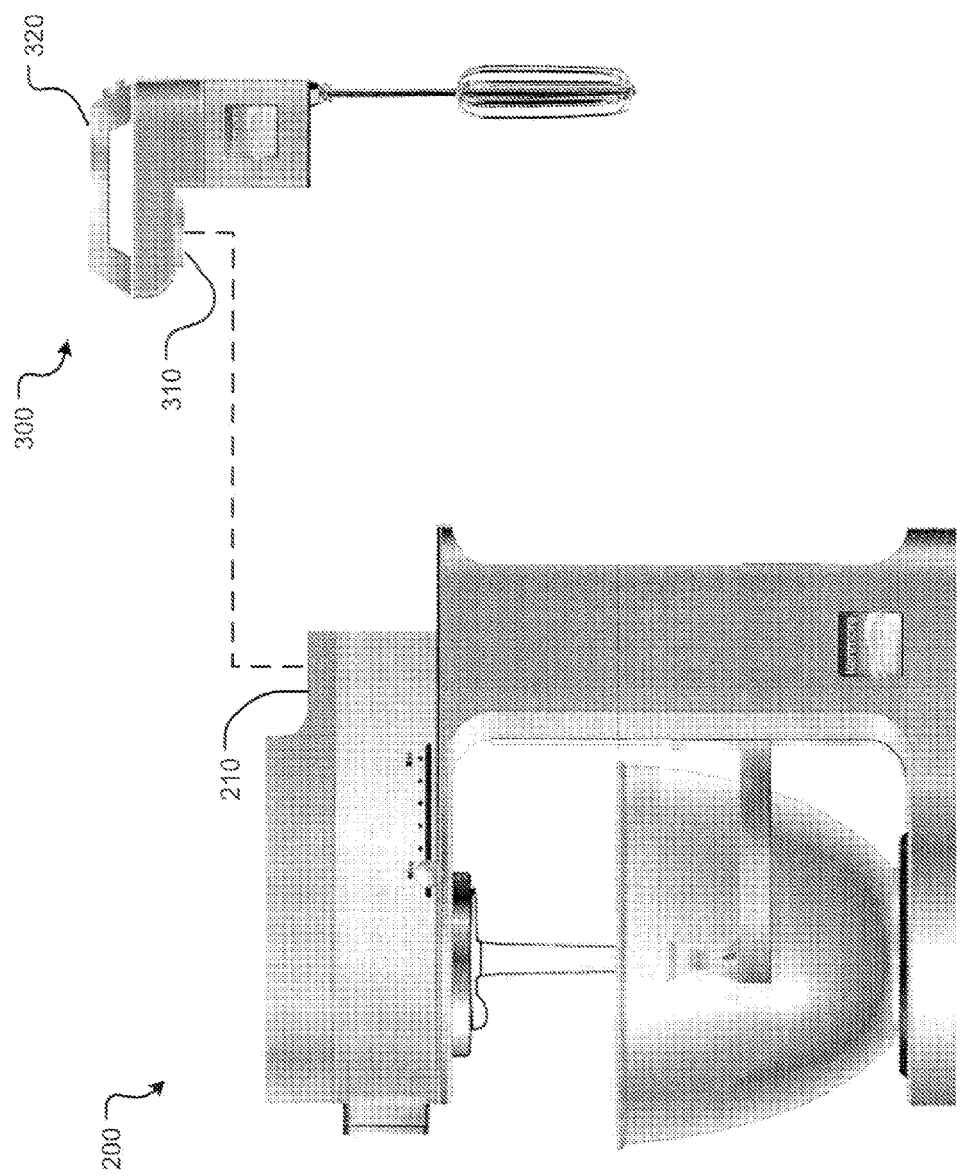
FIG. 2 illustrates the stand mixer of FIG. 1 with the cordless kitchen appliance separated therefrom, in accordance with an embodiment of the present invention.

With reference to FIG. 2, the stand mixer 200 includes a charging dock 210. The charging dock 210 is adapted to mate with and hold the separate cordless kitchen appliance 300. The charging dock 210 includes a charging output (not shown) that is adapted to provide a charging current to the cordless kitchen appliance 300. In one embodiment, the stand mixer 200 includes multiple charging docks 210 for charging multiple cordless kitchen appliances 300.

Aside from the charging dock 210 and corresponding internal circuitry, the stand mixer 200 may otherwise function as a conventional stand mixer. Thus, the stand mixer 200 can function as a mixer regardless of whether a cordless kitchen appliance 300

As shown in FIGS. 1 and 2, the cordless kitchen appliance 300 comprises a cordless hand mixer. It will be appreciated, however, that the cordless kitchen appliance 300 may comprise any other suitable cordless kitchen appliance, including but not limited to a can opener, an electric knife or an immersion blender. The cordless kitchen appliance 300 includes a rechargeable battery (not shown). As shown, the cordless kitchen appliance 300 also includes a charging interface 310, which is, coupleable with the charging dock 210 of the stand mixer 200 and adapted to receive the charging current from the charging output of the charging dock 210. Thus, while the cordless kitchen appliance 300 is docked in the charging dock 210, the charging dock 210 recharges the rechargeable battery of the cordless kitchen appliance 300.

Thus, embodiments provide a convenient, multi-function kitchen system—all in a space-saving package. Additionally, for the many consumers that keep their stand mixer on their counter and plugged in all the time, the attached cordless kitchen appliance will always be fully charged and ready to use without the need for a separate and unsightly charging cord.

The previous description of the disclosed embodiments is provided to enable any person skilled in the art to make or use the present invention. Various modifications to these embodiments will be readily apparent to those skilled in the art, and the generic principles defined herein may be applied to Other embodiments without departing from the spirit or scope of the invention. Thus, the present invention is not intended to be limited to the embodiments shown herein but is to be accorded the widest scope consistent with the principles and novel features disclosed herein.

What is claimed is:

1. A mixing system comprising:
   a stand mixer comprising:
      a mixer portion comprising a charging dock, the charging dock having a charging output that provides a charging current,
      an upright portion configured to support the mixer portion, and
      a base configured to support the upright portion; and
   a cordless kitchen appliance having a rechargeable battery disposed therein, wherein the cordless kitchen appliance is coupleable to the charging dock, and
   wherein the charging output provides the charging current to the rechargeable battery when the cordless kitchen appliance is coupled with the charging dock.

2. The mixing system as recited in claim 1 wherein the cordless kitchen appliance is a hand mixer.

3. The mixing system as recited in claim 1 wherein the cordless kitchen appliance is an electric can opener.

4. The mixing system as recited in claim 1 wherein the cordless kitchen appliance is an electric knife.

5. The mixing system as recited in claim 1 wherein the cordless kitchen appliance is an immersion blender.

6. The mixing system as recited in claim 1 wherein the stand mixer is operable as a mixer regardless of whether the cordless kitchen appliance is coupled with the charging dock.

7. The mixing system as recited in claim 1 wherein the upright portion and the charging dock are adapted to mate with and hold the cordless kitchen appliance while the rechargeable battery of the cordless kitchen appliance is being charged.

8. The mixing system as recited in claim 1 wherein the cordless kitchen appliance comprises a charging interface for mating with the charging dock of the stand mixer and for receiving the charging current from the charging output of the charging dock.

9. A mixing system comprising:
   a stand mixer comprising:
      a mixer portion comprising a charging dock, the charging dock having a charging output that provides a charging current,
      an upright portion configured to support the mixer portion, and
      a base configured to support the upright portion; and
   a plurality of cordless kitchen appliances, each having a rechargeable battery disposed therein, and each interchangeably coupleable to the charging dock, and
   wherein the charging output provides the charging current to a given cordless kitchen appliance when the given cordless kitchen appliance is coupled to the charging dock.

10. The mixing system as recited in claim 9 wherein at least one of the cordless kitchen appliances is a hand mixer.

11. The mixing system as recited in claim 9 wherein at least one of the cordless kitchen appliances is an electric can opener.

12. The mixing system as recited in claim 9 wherein at least one of the cordless kitchen appliances is an electric knife.

13. The mixing system as recited in claim 9 wherein at least one of the cordless kitchen appliances is an immersion blender.

14. The mixing system as recited in claim 9 wherein the stand mixer is operable as a mixer regardless of whether any of the cordless kitchen appliances is coupled with the charging dock.

15. The mixing system as recited in claim 9 wherein the upright portion and the charging dock are adapted to mate with and hold at least one of the cordless kitchen appliances while the respective rechargeable battery of the at least one of the cordless kitchen appliance is being charged.

16. The mixing system as recited in claim 9 wherein the cordless kitchen appliances each comprise a charging interface for mating with the charging dock of the stand mixer and for receiving the charging current from the charging output of the charging dock.

17. A stand mixer comprising:
   a mixer portion for combining food;
   an upright portion for supporting the mixer portion and for at least partially supporting a separate, rechargeable kitchen appliance;
   a base portion for supporting the upright portion and a mixing bowl; and
   a charging dock integrated into the mixer portion and coupleable to the separate, rechargeable kitchen appliance, the charging dock having a charging output that provides a charging current for charging a battery of the separate, rechargeable kitchen appliance when the separate, rechargeable kitchen appliance is coupled to the charging dock.

* * * * *